S. TRUSCOTT.
Car Wheel.
No. 6,030.          Patented Jan. 16, 1849.
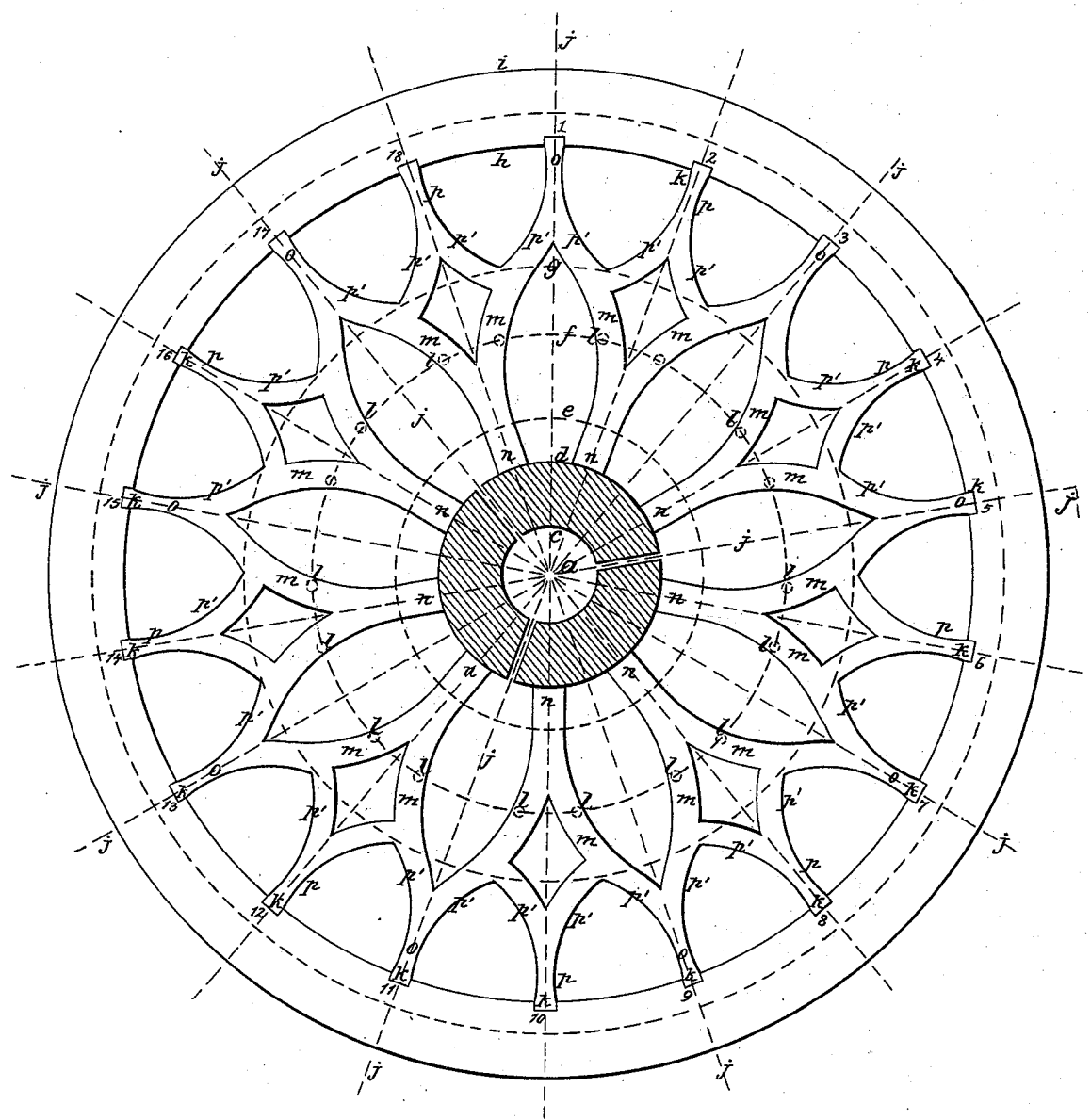

UNITED STATES PATENT OFFICE.

SAMUEL TRUSCOTT, OF COLUMBIA, PENNSYLVANIA.

CAST-IRON CAR-WHEEL.

Specification of Letters Patent No. 6,030, dated January 16, 1849.

*To all whom it may concern:*

Be it known that I, SAMUEL TRUSCOTT, of Columbia, Lancaster county, State of Pennsylvania, have invented a new and useful Improvement in Cast-Iron Car-Wheels, which is described as follows, reference being had to the annexed drawings of the same, making part of this specification.

Figure 1, is a plan of the wheel.

The nature of my invention and improvement consists in forming the wheels with a combination of curved spokes or arms of such forms and character as to produce a continuous and uninterrupted tie and bracing of all the said curved arms, or spokes, with themselves, and with the rim, and hub, by which intermediate, or auxiliary, or zigzag rims, are formed in the annular space between the hub, and outer rim and by which the number of the bearing points on the said outer rim is made double those on the hub, making a much stronger and more beautiful wheel than has yet been produced; and which will not be liable to crack in cooling when cast in chills, as is now generally practised.

In forming the patterns to mold this wheel I lay down the eccentric circles lettered $c$, $d$, $e$, $f$, $g$, $h$, $i$, from the center $a$. I divide the circle $h$ into 18 equal parts, more or less, according to the number of spokes to be employed. From the center $a$ I draw the radial lines $j$ through the several points $k$, on the circle $h$. I then scribe the several arches from the points $k$ with a radius equal to one of the divisions of the circle $h$. I then lay down the points $l$ on the circle $f$ and scribe the segments of arches $m$ that unite the arches with the radial arms $n$ near the hub, and unite with the segments $o$ of the arches that extend to and connect with the rim of the wheel. This manner of connecting the arms of the wheel by giving them a cyma reversa form and blending them into each other produces a complete endless zigzag open rim $m$, $n$, $o$ of great strength, in the circular space, between the outer periphery of the hub $c$, $d$ and the inner periphery of the rim $h$, $i$, the bearing points on the hub and rim being equal. The number of bearing points on the rim is then doubled by introducing a series of curved arms $p$ in the spaces between the arms described above to which they are united by curved branches in the manner represented at $p'$ Fig. 1. These arms also form a continuous endless tie and zigzag rim concentric with the rim of the wheel. When the several series of curved segments unite, their ends are curved in reverse directions so as to blend together gracefully and to produce increased strength, as shown at $p'$.

The model being prepared the casting of wheels is performed with cores and chills in the usual manner. The wheels in cooling will not be so liable to break as other wheels, the arms or spokes being all curved will yield as the rim changes its diameter in cooling and being cast in chills it necessarily will cool sooner than the spokes.

The hub is divided into segments in casting as is usually practised.

What I claim as my invention and desire to secure by Letters Patent is—

Tying and bracing the arms of the wheel together in the annular space between the rim and hub substantially as described in the foregoing specification and represented in the annexed drawings forming intermediate, or auxiliary, or zigzag rims in said annular space and double the number of bearing points on the rim that there are on the hub by which form of construction cast iron chilled car wheels are rendered much stronger, and less liable to fracture in casting, than the cast iron spoke wheel in use.

In testimony whereof I have hereunto signed my name before two subscribing witnesses.

SAML. TRUSCOTT.

Witnesses:
WM. P. ELLIOT,
A. E. H. JOHNSON.